G. FALK & E. L. GINSKEY.
HOSE CONNECTION FOR STREET SPRINKLING CARTS.
APPLICATION FILED JULY 7, 1914.

1,165,582.

Patented Dec. 28, 1915.
2 SHEETS—SHEET 1.

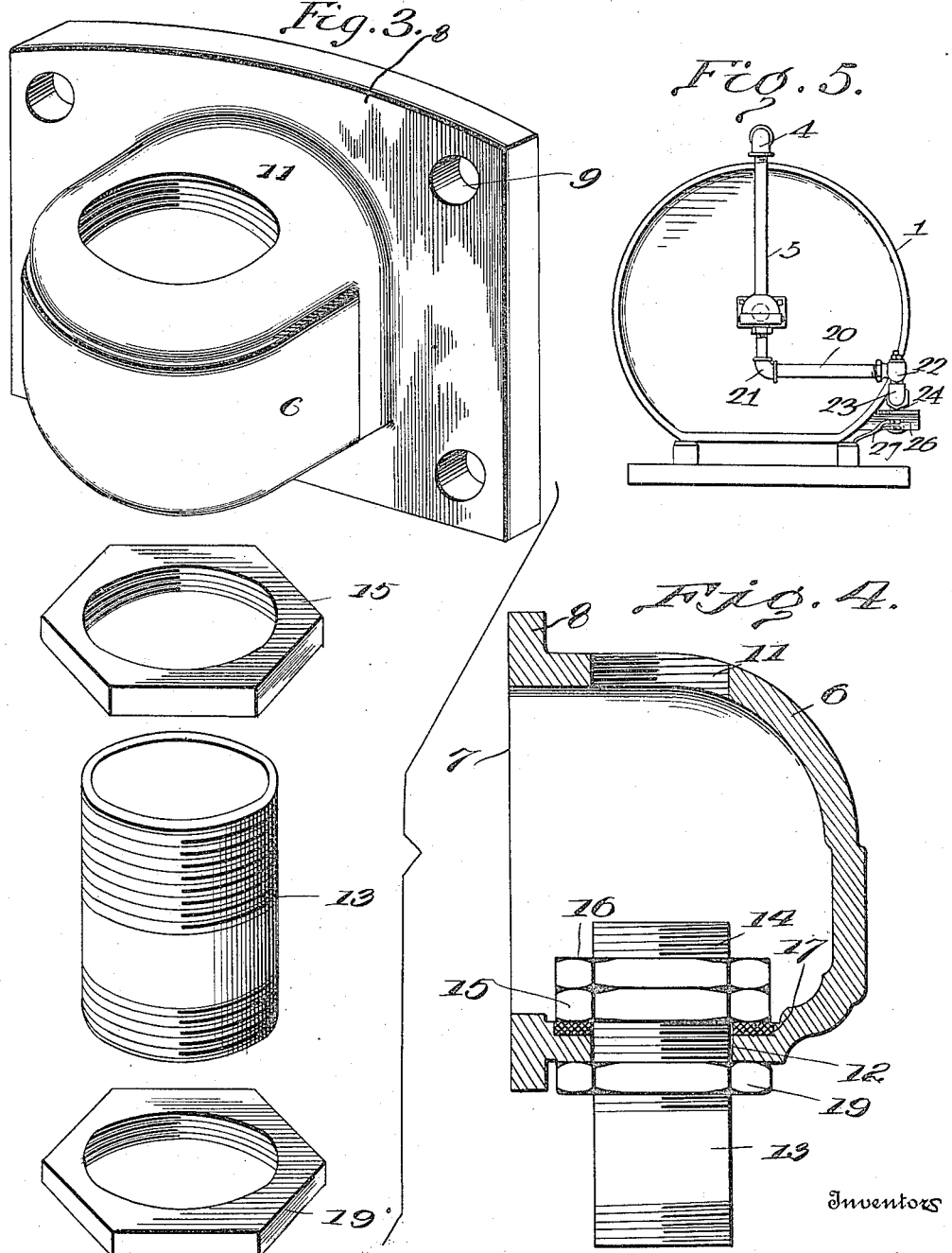

UNITED STATES PATENT OFFICE.

GEORGE FALK AND EDWIN L. GINSKEY, OF LA CROSSE, WISCONSIN, ASSIGNORS OF ONE-THIRD TO JOHN BLAJESKE, OF LA CROSSE, WISCONSIN.

HOSE CONNECTION FOR STREET-SPRINKLING CARTS.

1,165,582.   Specification of Letters Patent.   Patented Dec. 28, 1915.

Application filed July 7, 1914. Serial No. 849,495.

*To all whom it may concern:*

Be it known that we, GEORGE FALK and EDWIN L. GINSKEY, citizens of the United States, residing at La Crosse, in the county of La Crosse and State of Wisconsin, have invented certain new and useful Improvements in Hose Connections for Street-Sprinkling Carts, of which the following is a specification.

This invention relates to filling hose connections for street sprinkling and flushing carts and has as its object to overcome the numerous disadvantages possessed by a hose connection of the ordinary character.

The ordinary sprinkling and flushing carts have their water tanks provided with a filling opening and when it is desired to fill the tank, one end of a suitable length of hose is inserted in this opening and the other end of the hose is connected to the street plug. After the tank has been filled, the hose is folded or laid across the top and the rear end of the tank in suitable brackets and usually without thoroughly draining the water therefrom. In thus arranging the hose a number of sharp bends are formed therein and after the hose has been in use for a short length of time it becomes weakened at the points of formation of the bends or folds and must be replaced or repaired. Furthermore the water which is not drained from the hose soon rots the same, further shortening the life of the hose.

It is therefore the aim of the present invention to provide a filling hose connection for a cart of the class mentioned so constructed and arranged that a relatively short length of hose may be employed in connection with the device, and when not in use may be supported beside the tank in such position as to drain the water therefrom and to prevent the formation of bends or folds therein.

A further aim of the invention is to provide a hose connection of the class mentioned, of such construction and so arranged that the tank of the cart may be filled from one side or the other, as may be found most convenient.

Figure 1:
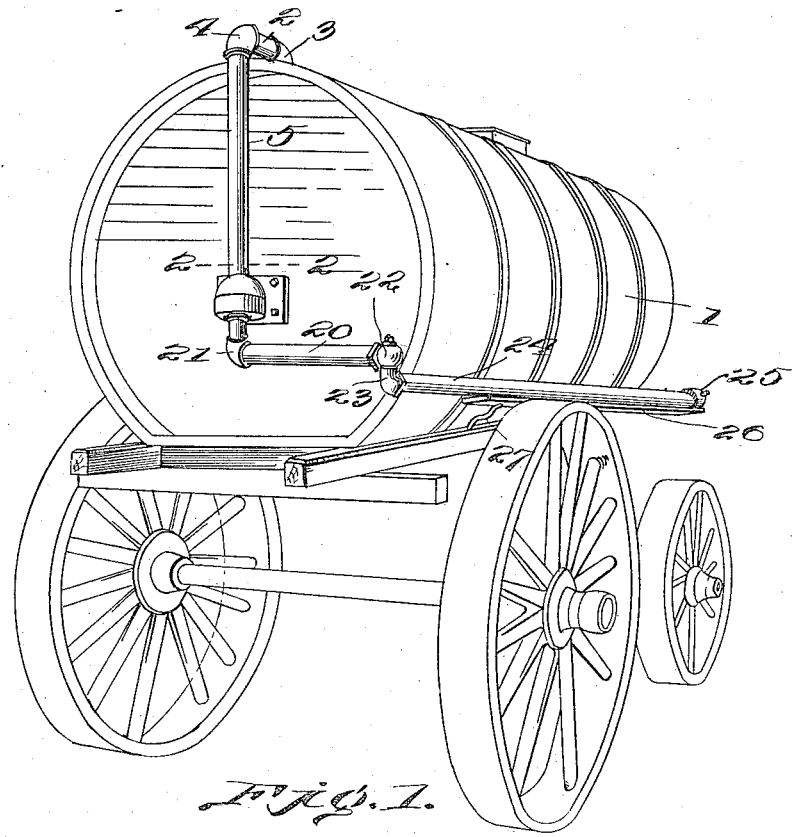
Figure 2:
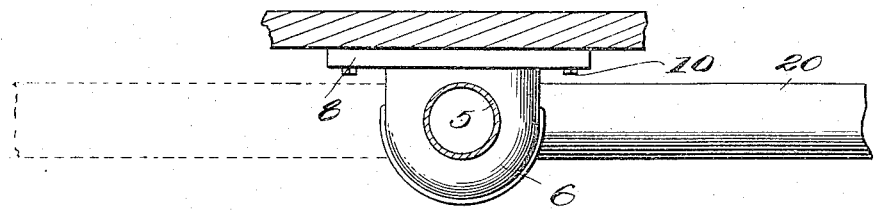

In the accompanying drawings: Figure 1 is a perspective view of the coupling embodying the present invention applied to the tank of a sprinkling or flushing cart. Fig. 2 is a horizontal sectional view on the line 2—2 of Fig. 1. Fig. 3 is a group perspective view, illustrating parts of the coupling embodying the present invention about to be assembled. Fig. 4 is a vertical front to rear sectional view through a portion of the coupling. Fig. 5 is a rear elevation of the device.

Corresponding and like parts are referred to in the following description and indicated in all the views of the accompanying drawings by the same reference characters.

In the drawings, the numeral 1 indicates in general the tank of a street sprinkling or flushing cart, which tank is in the usual manner mounted upon a wheeled frame and provided with the usual sprinkling or flushing apparatus (not shown). Fig. 1 of the drawings is a perspective view looking at the rear end of the tank, and in this view, the numeral 2 indicates a relatively short length of pipe connected by an elbow 3 with the upper side of the tank and thereby placed in communication with the interior of the tank. The elbow 4 connects the other end of the pipe 2 with the upper end of a rigid pipe 5 which extends vertically beside the rear end of the tank and at its lower end is in communication with that member of the coupling shown in Figs. 2, 3 and 4 of the drawings. The coupling member shown in these figures is preferably in the nature of a hollow casting, the hollow body of which is indicated by the numeral 6 and is provided with an open rear side 7 surrounded by an integral attaching plate portion 8 having a number of bolt openings 9 formed therein through which may be secured bolts 10, the bolts serving to secure the casting to the rear end wall of the tank, as shown in Fig. 2. In its upper side, the body 6 is formed with a threaded opening 11 into which is fitted the lower end of the pipe 5. The bottom or under side of the body 6 is also formed with an opening, indicated by the numeral 12 and located directly below the opening 11. A relatively short length of pipe 13 is fitted rotatably in the opening 12 and has its upper portion threaded, as at 14, for the application of a nut 15 and a jam nut 16 surrounding the opening 12. The upper side of the bottom of the body 6 is formed with a recess 17 to which is fitted a packing gasket 18 which may be of rubber, leather, or any other suitable material capable of forming a water tight adjustment when engaged by the under face of the nut 15. A nut 19 is threaded upon the pipe 13 and bears against the under side of the said bottom of the body 6 and it will be understood that in this manner the pipe 13 is connected for swivel movement with the body 6 and is in communication with the interior of the body. Inasmuch as the open rear side of the body is disposed flat against the surface of the end wall of the tank 1, the said side of the body is closed and any water introduced into the body through the pipe 13 will flow from the body through the pipe 5 and into the tank. A pipe 20 is connected by an elbow 21 with the lower end of the short pipe 13 and extends at right angles from the pipe 5 or, in other words, substantially horizontal. It will, at this point, be understood that inasmuch as the pipe 13 is swiveled in the bottom of the casting 6, the pipe 20 may be swung to extend in either direction transversely across the rear side or wall of the tank.

The numeral 22 indicates one member of a swiveled union, which member is fitted to the outer end of the pipe 20 and the other member of this union is indicated by the numeral 23 and is fitted to one end of a flexible hose 24 of any desired length, the hose being provided at its other end with the usual coupling 25 which adapts it for application to a street plug or other source of water supply. In order to support the flexible hose 24 in straight position and in position to be drained when not in use, a relatively narrow shelf or ledge 26 is mounted upon brackets 27 at one side or the other, or one at each side of the tank 1, this shelf being inclined downwardly and forwardly from its rear end and being of a length to support the hose in the manner stated when the hose is laid thereon.

From the foregoing description of the invention, it will be understood that the pipe 20 may, as before stated, be swung to extend toward one side or the other of the tank and it will further be apparent that the hose 24 may be led forwardly or rearwardly at any desired angle from either side of the tank due to the provision of the swivel union comprising the members 22 and 23. When it is desired to fill the tank, the hose 24 is swung around and connected to the street plug or other source of water supply. After the tank has been filled, the hose is disconnected from the plug and the pipe 20 is swung to position extending toward one side or the other of the tank and across the rear end of the tank and the hose 24 is laid upon the shelf 26. Due to the inclination of the shelf, the hose will drain thoroughly and no bends or folds will be permitted to form therein.

Having thus described the invention, what is claimed as new is:

1. The combination with a watering tank, of a pipe leading into the tank, a rigid pipe having swivel connection with the first-mentioned pipe and arranged to extend in either direction transversely across one end of the tank with its outer end projecting beyond the side of the tank, a flexible pipe connected with the last-mentioned pipe, and a support for the flexible pipe located at one side of the tank.

2. The combination with a watering tank, of a pipe leading into the tank, a rigid pipe having swivel connection with the first-mentioned pipe and arranged to extend in either direction transversely across one end of the tank with its outer end projecting beyond the side of the tank, a flexible pipe connected with the last-mentioned pipe, and a supporting ledge for the flexible pipe located at one side of the tank and inclined downwardly from the said end of the tank toward the other end thereof.

3. The combination with a watering tank, of a pipe leading into the top of the tank and having a portion extending downwardly beside one end of the tank, a rigid pipe having swivel connection with the lower end of the said portion, the said swivel connection being secured rigidly to the said end of the tank and the said second mentioned pipe being adjustable to extend beside the said end of the tank toward either side of the tank, a flexible pipe connected with the second mentioned pipe, and a support for the said flexible pipe located at one side of the tank.

4. In a filling hose connection of the class described, a hollow body having an open attaching side and provided in its top with means for the connection of a pipe, the said body being formed in its bottom with an opening, a short length of pipe fitted into the said opening and provided with an abutment bearing against the under side of the body, a packing gasket disposed to surround the pipe and to rest upon the inner surface of the bottom of the body, and a nut threaded upon the said pipe and bearing against the said packing gasket, the open side of the body providing for the application and removal of the said nut and gasket.

In testimony whereof we affix our signatures in presence of two witnesses.

GEORGE FALK. [L. S.]
EDWIN L. GINSKEY. [L. S.]

Witnesses:
 JOSEPH J. FRISCH,
 JOHN BLOSJASKE.

Copies of this patent may be obtained for five cents each, by addressing the "Commissioner of Patents, Washington, D. C."